US011222133B1

(12) United States Patent
Gassner et al.

(10) Patent No.: US 11,222,133 B1
(45) Date of Patent: Jan. 11, 2022

(54) USER PROGRAMMATIC INTERFACE FOR SUPPORTING DATA ACCESS CONTROL IN A DATABASE SYSTEM

(71) Applicant: Veeva Systems Inc., Pleasanton, CA (US)

(72) Inventors: Peter Gassner, Pleasanton, CA (US); Andrew Han, Needham, MA (US); Igor Tsives, Saratoga, CA (US); Jon Stone, Manteca, CA (US); Marius K. Mortensen, Burlington (CA); Scott Immel, Chapel Hill, NC (US); Piotr Kuchnio, Toronto (CA); Andrew James Mitchell, Littleton, MA (US); Asaf Roll, Richmond Hill (CA); Zhen Tan, North York (CA)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 16/863,956

(22) Filed: Apr. 30, 2020

Related U.S. Application Data

(63) Continuation-in-part of application No. 15/811,470, filed on Nov. 13, 2017, now Pat. No. 10,796,013.

(51) Int. Cl.
*G06F 21/71* (2013.01)
*G06Q 10/06* (2012.01)
*G06F 21/62* (2013.01)
*G06F 16/9038* (2019.01)
*G06F 16/9035* (2019.01)
*G06F 21/60* (2013.01)

(52) U.S. Cl.
CPC ...... *G06F 21/6227* (2013.01); *G06F 16/9035* (2019.01); *G06F 16/9038* (2019.01); *G06F 21/604* (2013.01)

(58) Field of Classification Search
None
See application file for complete search history.

(56) References Cited

U.S. PATENT DOCUMENTS

| | | | |
|---|---|---|---|
| 6,810,259 B1 * | 10/2004 | Zhang | H04W 8/18 455/435.1 |
| 9,092,137 B2 | 7/2015 | Gassner et al. | |
| 9,430,229 B1 | 8/2016 | Zijst et al. | |

(Continued)

FOREIGN PATENT DOCUMENTS

EP 3579241 A1 * 12/2019 ............. G16H 10/60

OTHER PUBLICATIONS

Aleksy, Using JDOSecure to Introduce Role-Based Permissions to Java Data Objects-based Applications, Sep. 2006.

(Continued)

*Primary Examiner* — Venkat Perungavoor

(57) ABSTRACT

Systems and methods for providing an API for a database system. The API may be provided to enable external application developers to build applications that can support the dynamic security model of the content management system and describe the runtime properties of records in data objects. The API of may provide a record property object and/or a query describe object when returning data set in response to a query by providing information about actions an end user can take on the data records, and to provide metadata required to understand a data response.

20 Claims, 13 Drawing Sheets

(56) References Cited

U.S. PATENT DOCUMENTS

| | | | |
|---|---|---|---|
| 9,779,063 B1 | 10/2017 | Dykema | |
| 9,902,299 B2* | 2/2018 | Muller | B60N 2/015 |
| 2004/0230892 A1 | 11/2004 | Horton | |
| 2005/0289111 A1 | 12/2005 | Tribble et al. | |
| 2006/0206510 A1 | 9/2006 | Moulhaud et al. | |
| 2007/0073688 A1 | 3/2007 | Fry | |
| 2007/0150447 A1 | 6/2007 | Shah et al. | |
| 2007/0294318 A1* | 12/2007 | Arora | G06Q 10/06 |
| 2008/0005287 A1 | 1/2008 | Harvey et al. | |
| 2008/0147647 A1 | 6/2008 | Reeb | |
| 2009/0276471 A1 | 11/2009 | Baer et al. | |
| 2009/0287628 A1 | 11/2009 | Indeck et al. | |
| 2010/0088317 A1* | 4/2010 | Bone | G06F 16/134 |
| | | | 707/737 |
| 2012/0150685 A1 | 6/2012 | Hinojosa et al. | |
| 2012/0254090 A1* | 10/2012 | Burris | G06N 5/027 |
| | | | 706/47 |
| 2012/0278786 A1* | 11/2012 | Ruiz | G06Q 10/06 |
| | | | 717/102 |
| 2013/0086039 A1* | 4/2013 | Salch | G06F 16/183 |
| | | | 707/717 |
| 2013/0117313 A1 | 5/2013 | Miao et al. | |
| 2014/0122523 A1 | 5/2014 | Aggarwal et al. | |
| 2015/0220659 A1* | 8/2015 | Rissanen | G06F 21/6218 |
| | | | 707/759 |
| 2015/0254456 A1 | 9/2015 | Jacquin | |
| 2015/0363468 A1 | 12/2015 | Alvey et al. | |
| 2016/0119380 A1 | 4/2016 | Gutesman et al. | |
| 2016/0189321 A1 | 6/2016 | Halpern et al. | |
| 2016/0246802 A1 | 8/2016 | Regni et al. | |
| 2016/0255082 A1 | 9/2016 | Rathod | |
| 2016/0359920 A1* | 12/2016 | Abuelsaad | H04W 12/08 |
| 2016/0366183 A1 | 12/2016 | Smith et al. | |
| 2017/0337391 A1 | 11/2017 | Chang et al. | |
| 2018/0234462 A1* | 8/2018 | Kruse | H04L 63/10 |
| 2019/0392068 A1* | 12/2019 | Wen | G06F 16/24545 |

OTHER PUBLICATIONS

Asghar et al., Supporting Complex Queries and Access Policies for Multi-user Encrypted Databases, ACM. 2013.

Bartel et al., Static Analysis for Extracting Permission Checks of a Large Scale Framework—The Challenges and Solutions for Analyzing Android, IEEE Transactions of Software Engineering, Jun. 2014, vol. 40 No 6.

Sekar et al., Avoidance of Security Breach through Selective Permissions in Android Operating System, 2012, vol. 37 No. 12, ACM SIGSOFT Software Engineering Notes.

* cited by examiner

| Name | User | Role | Doc Type | Product | Country |
|------|------|------|----------|---------|---------|
| DAC 001 | John Smith | Reviewer | Digital | Coldcap | USA |
| DAC 002 | Joan White | Owner | | Restalot | Canada |

FIG. 4

USER PROGRAMMATIC INTERFACE FOR SUPPORTING DATA ACCESS CONTROL IN A DATABASE SYSTEM

CROSS-REFERENCE TO RELATED APPLICATION

The present application is a continuation-in-part application of U.S. nonprovisional patent application Ser. No. 15/811,470, filed on Nov. 13, 2017, entitled User Programmatic Interface for Supporting Data Access Control in a Database System, and a continuation-in-part application of U.S. nonprovisional patent application Ser. No. 16/264,471, filed on Jan. 31, 2019, entitled Case Management in a Content Management System, which are hereby incorporated by reference herein for all purposes.

BACKGROUND

The subject technology relates generally to database management, and more particularly to an interface for supporting data record access control in database management systems.

Content management systems and other database management systems are widely used today. However, because of the large volume of documents in content management systems, large number of users, and their different permissions to access the documents, document access control has become more and more sophisticated. For example, some content management systems control user access to documents by their roles. Accordingly, it is desirable to provide a user interface so that developers, who build applications on a platform, e.g., a content management system, can make sure that their applications can access and display data in the content management system properly.

SUMMARY

The disclosed subject matter relates to a method for responding to a query in a database system. The method comprises: receiving record properties of a first data record and a second data record in the database system, wherein the record properties are defined dynamically based on application state. The method further comprises: receiving a first query for data objects in the database system; obtaining the first data record in response to the first query; obtaining record properties of the first data record; and displaying the first data record together with the record properties of the first data record on an interface.

BRIEF DESCRIPTION OF THE DRAWINGS

FIG. 4 illustrates an example user interface for receiving user setup records.

DETAILED DESCRIPTION

Figure 1:
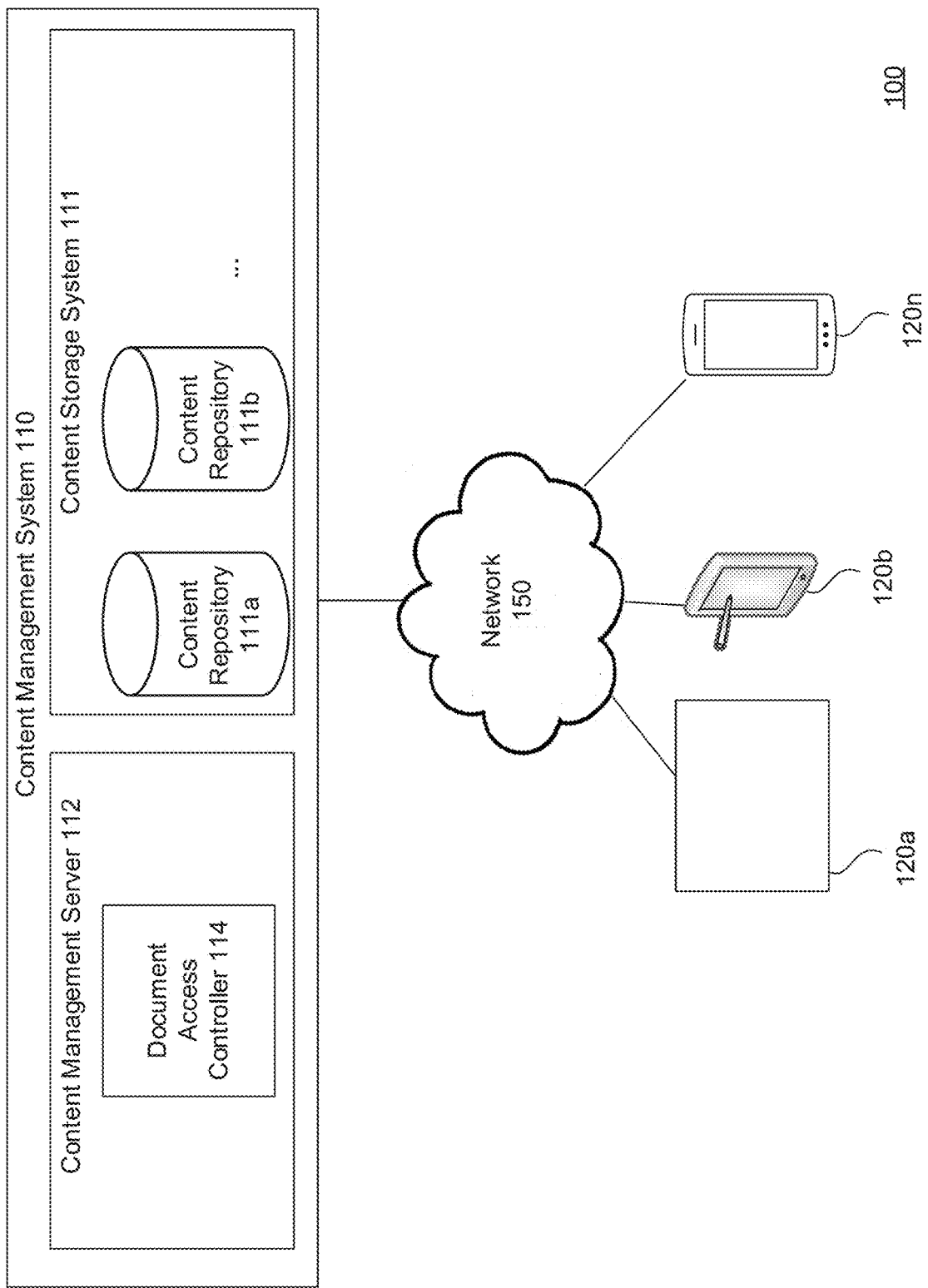
FIG. 1 illustrates an example high level block diagram of an enterprise content management architecture wherein the present invention may be implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

In some content management systems, the permissions to access certain records and set of available actions on such records may be based on object states and user roles, and may be different for each record and user. This makes a static metadata describe application programming interface ("API") inadequate to accurately describe the record properties given user permissions. Understanding permissions, actions, and other properties of a record is critical for application development so that the application may present the correct behavior to the end user. For example, the application will need to be able to hide fields (or make fields visible), make fields read-only (or editable), validate user input and present a set of valid actions to the end user based on the configuration of the content management system and actions available to end user. The present invention enhances content management systems by providing a user interface to external application developers to enable them to build applications that can support the dynamic security model of the content management system and describe run-time properties of data object records.

Dynamic security may allow an administrator of a customer of the content management system to set up security rules, that may define not only access to a particular data record, but also access to a particular field within the data record, depending on a rule. With this type of granular security, when the content management system returns a set of records, it is desirable to provide information indicating what an end user can do with the data record (e.g., view, or edit). The user programmatic interface of the present invention may provide a record property object and/or a static query describe object when returning data set in response to a query to support the dynamic security by providing information about actions an end user can take on the data records, and to provide metadata required to understand a data response.

The present invention may be used in various development use cases. One example is external application built on a content management API (e.g., Veeva™ Align). The application, which runs externally (not in the content management process) but provides a user interface on the content management data, will require record properties, metadata, and CRUD to provide an acceptable user experience.

Some concepts of the present invention are defined below:

Configuration metadata. In the present invention, configuration metadata refers to the data that describes the configuration of the content management system. Configuration metadata is static and consistent across records and users. Relevant configuration metadata may include:

1. Permission Sets (Object and Object Field Permission),
2. Objects (Objects and Object Fields), and
3. State-Role field level security ("FLS") Rules.

Record properties. In the present invention, record properties refer to data that describes the run-time properties of an object record. The property values may be determined dynamically based on the application state, data, and configuration metadata. Property values will differ for each record and user.

Permission field level security ("FLS") in the present invention is FLS defined at the Permission Level.

State-Role FLS in the present invention is FLS defined based on Object state or the combination of object state and user role.

FIG. 1 illustrates an example high level block diagram of an enterprise content management architecture 100 wherein the present invention may be implemented. The enterprise may be a business, or an organization. As shown, the architecture 100 may include a content management system 110, and a plurality of user computing devices 120a, 120b, . . . 120n, coupled to each other via a network 150. The content management system 110 may include a content storage system 111 and a content management server 112. The content storage system 111 may have one or more content repositories, e.g., 111a and 111b. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs).

The content storage system 111 may store content that user computing devices 120a-120n may access. Each content repository (e.g., 111a or 111b) may store a specific category of content, and allow users to interact with its content in a specific business context.

The content management server 112 is typically a remote computer system accessible over a remote or local network, such as the network 150. In one implementation, the content management server 112 may have a document access controller 114 which may control the process for setting up user roles, generating user groups, matching user groups and documents, and stamping user groups on matching documents.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
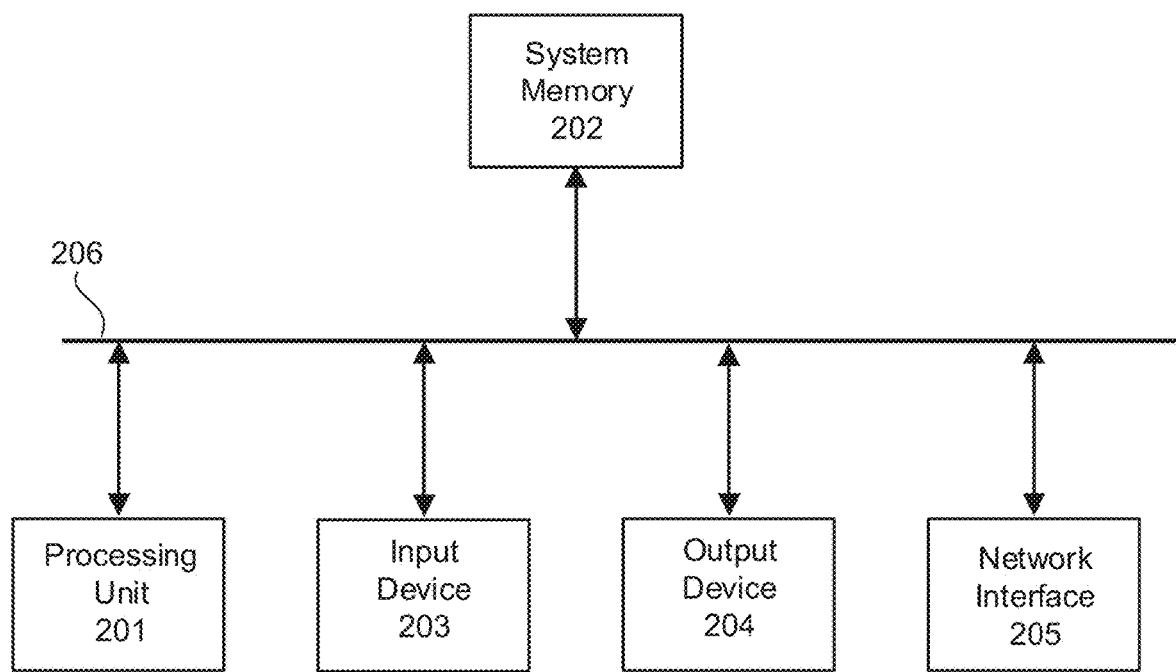
FIG. 2 illustrates an example high level block diagram of a computing device.

FIG. 2 illustrates an example block diagram of a computing device 200 which can be used as the user computing devices 120a-120n, and the content management server 112 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 304 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
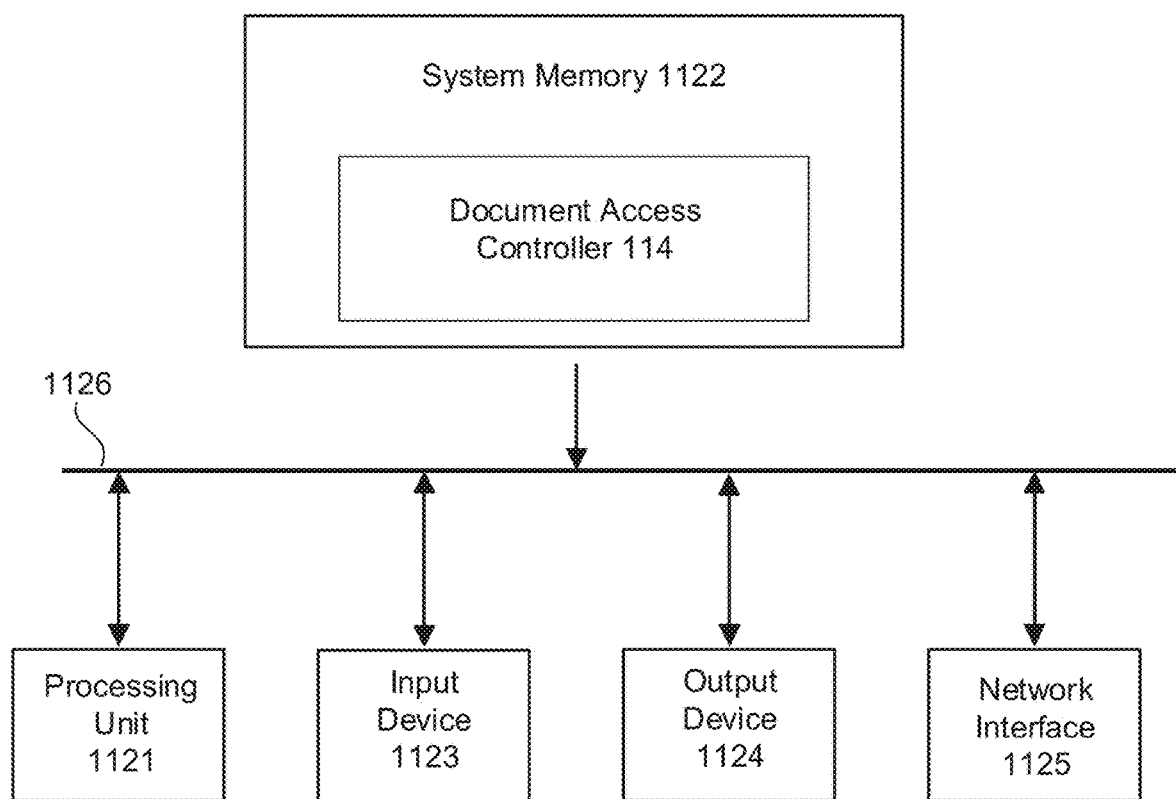
FIG. 3 illustrates an example high level block diagram of the content management server according to one embodiment of the present invention.

FIG. 3 illustrates an example high level block diagram of the content management server 112 according to one embodiment of the present invention. The content management server 112 may be implemented by the computing device 200, and may have a processing unit 1121, a system memory 1122, an input device 1123, an output device 1124, and a network interface 1125, coupled to each other via a system bus 1126. The document access controller 114 may be stored in the system memory 1122.

An enterprise may subscribe the content management service as a customer. End users may play different roles when accessing documents, e.g., owner and reviewer. In one implementation, end user setup records may be used to define the roles. As shown in FIG. 4, the end user setup records may be included in a table, and each end user setup record may have one or more fields. The fields may define the end user's access permissions based on his/her responsibilities and/or skillsets, and may include role, product, country, document type and other attributes.

A customer's system administrator may define what role(s) an end user may play, assign end users, or employees, different roles, and manage the roles with the end user setup records. A system administrator may use attributes in fields of the user setup records to group users depending on its business need. The system administrator may select default fields and/or attributes provided by the content management system 110, or add new fields and/or attributes to customize user roles. In one example, one user setup record may define a user as a reviewer, who is familiar with a product Coldcap and a country Canada. An end user's access to a data record in the content management system 110 may depend on the role assigned to him/her.

Figure 5A:
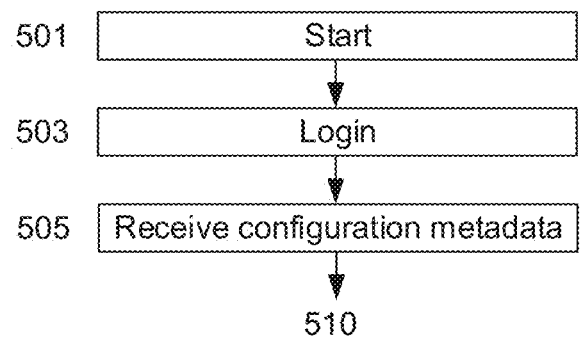
FIGS. 5A and 5B illustrate an example flowchart of a method for providing a user interface to support data access control in a content management system according to one embodiment of the present invention.
Figure 5B:
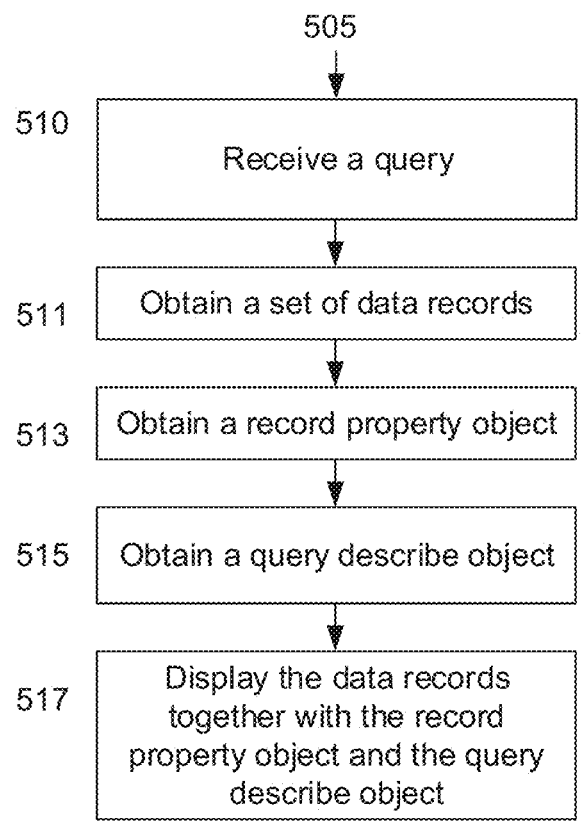

FIGS. 5A and 5B illustrate an example flowchart of a method for providing a user programmatic interface according to one embodiment of the present invention. The process may start at 501.

At 503, a system administrator may login to the content management system 110.

At 505, the content management system 110 may receive configuration metadata from the system administrator. The configuration metadata may provide information about each record that is coming back in a response, for example, if the user has certain permissions on the particular record (e.g., edit and delete), and if a particular record field is editable or hidden from the user.

A record property object describes the properties of a data record, and may include information on why a field is not displayed, e.g., hidden. For each record it may include:
1) Record id;
2) Record permissions—consistent with permission set actions (Read, Edit, and Delete); and
3) Record user actions—list of user actions available on this record with link to perform each action.

For requested fields on the record the response may include:
1) Edit—array of fields that are editable; and
2) Hidden—array of fields that are hidden.

One example of a record property object is as follows:
"id": "0VP000000000101
"permissions":
　"read": true,
　"edit": true,
　"delete": false
"field_properties":
　"edit": ("component_name"),
　"hidden": ("component_name", "component_type")

In one example, a record may have five fields. One field may be read-only to an end user. The way it is represented may be: it will not be shown in "edit", and not shown in "hidden". Return may include an array of fields that are editable, and an array of fields that are hidden.

A query may be received at 510.

At 511, a set of data records responsive to the query may be obtained from the content management system 110 and returned by the content management server 112.

At 513, a record property object may be generated for each data record in the set of data records and returned by the content management server 112.

To eliminate the complexity in understanding a query response, a query describe object may be generated by the content management server 112 and returned as part of the response to a query at 515, and may provide static metadata required to understand a data response. It may include:
1) Field name, Label
2) Data type
3) Max Length, Min/Max Values
4) Uniqueness
5) Status (Active, Inactive)

Examples of a couple of query describe objects are shown below:
"query_describe": {
　"name": "product_v",
　"label": "Product",
　"label_plural": "Products",
　"metadata": [
　　{
　　"label": "ID",
　　"type": "ID",
　　"required": false,
　　"name": "id",
　　"status": [
　　　"active_v"
　　]
　},
　{
　　"label": "Product Name",
　　"type": "String",
　　"required": true,
　　"unique": true,
　　"name": "name v",
　　"status": [
　　　"active_v"
　　]
　　"max_length": 128, In one example, when a response has four fields, the query describe object may provide metadata about each field and describe the shape of fields queried, including its name, its readable label, its datatype, and if it is a required field, unique field, a string, a number or a boolean. That metadata may apply to all records in the response, and provide information on how to process the response data.

Although the set of data records, record property objects, and query describe objects are shown to be obtained at 511, 513 and 515 separately in FIG. 5B, it should be appreciated that they can be obtained simultaneously.

At 517, the set of data records may be displayed together with the record property objects and the query describe objects on a user interface.

In one implementation, the query with properties pattern can be used by an external application which requires records and record properties for a set of records. This pattern will retrieve both with a single API call, reducing roundtrips. The response in this pattern contains both the "data" object and "record_property" object as a pair of symmetric arrays.

In one implementation, the reporting component of the content management system may have the requirement to filter data on the client side of the query language. In order to support this functionality when the query comes from reporting, the response may include hidden data fields and a client, e.g., an external program, is required to perform the hiding on the client side.

In one implementation, an error may be returned when a field is requested but the end user does not have access to. In one implementation, fields may not be returned for any cell (row-field) that the user does not have access to.

The present invention may be applied to any data query and any system that returns a data set, e.g., SQL. For example, an API that returns records from a relational database, may return record properties.

Adverse event management systems are used by pharmaceutical companies, or customers, for the collection, management, and real-time oversight of adverse events. As an adverse event is reported, it may go through a variety of different channels. A case may be created to record details of the adverse event, including what happened, how severe it is, and if it is expected. A medical reviewer may review the case, make sure it is coded with appropriate medical terms, and see what additional details are needed to analyze the relationship between the adverse event and the products that the patients were taking. The medical reviewer will then give an initial assessment, and submit the case to a government agency, e.g., FDA.

After an adverse event is reported, subsequent updates (e.g., lab reports or additional data) that may impact the initial assessment may become available. There is a lifecycle going on for the initial case, from case entry, medical review, ready for approval, to submission and case close. If an update comes in afterwards and provides more information about the adverse event, the user may submit a follow-up which may change how the adverse event is associated to a drug product. A follow-up is a new version of the case, and also has a lifecycle, from case entry, medical review, ready for approval, to submission and case close.

Pharmaceutical companies are required to report adverse events in a certain period of time. For example, they may have 15 days to report a life-threatening condition. The present invention provides a process for parallel follow-ups when there is a follow-up becoming available in the middle of either the initial case or an earlier follow-up, that is material and may change the case perspective but can't be included in the initial case or earlier follow-up because it is too close to their deadlines. The present invention facilitates submission of the initial case or the earlier follow-up, while processing a parallel follow-up for the secondary information at the same time.

The present invention may track cases with standard and configurable workflows, and streamline adverse event management with routing of cases for initial case, follow-ups, and parallel follow-ups. $ The present invention allows proper versioning of the initial case, its follow-ups and parallel follow-ups, and complete case separation. A parallel follow-up can be processed alongside the initial case, or its earlier follow-ups. User can submit the initial case or its earlier follow-ups before their deadlines, and then quickly submit the parallel follow-up.

Present invention allows creation of a complete copy of all versions of a case and their children when creating a follow-up or parallel follow-up. All data can be independently changed, without impacting another version. When the initial case is closed, its information is saved. Any follow-ups or parallel follow-ups will happen in isolation without impacting one or another.

Figure 6:
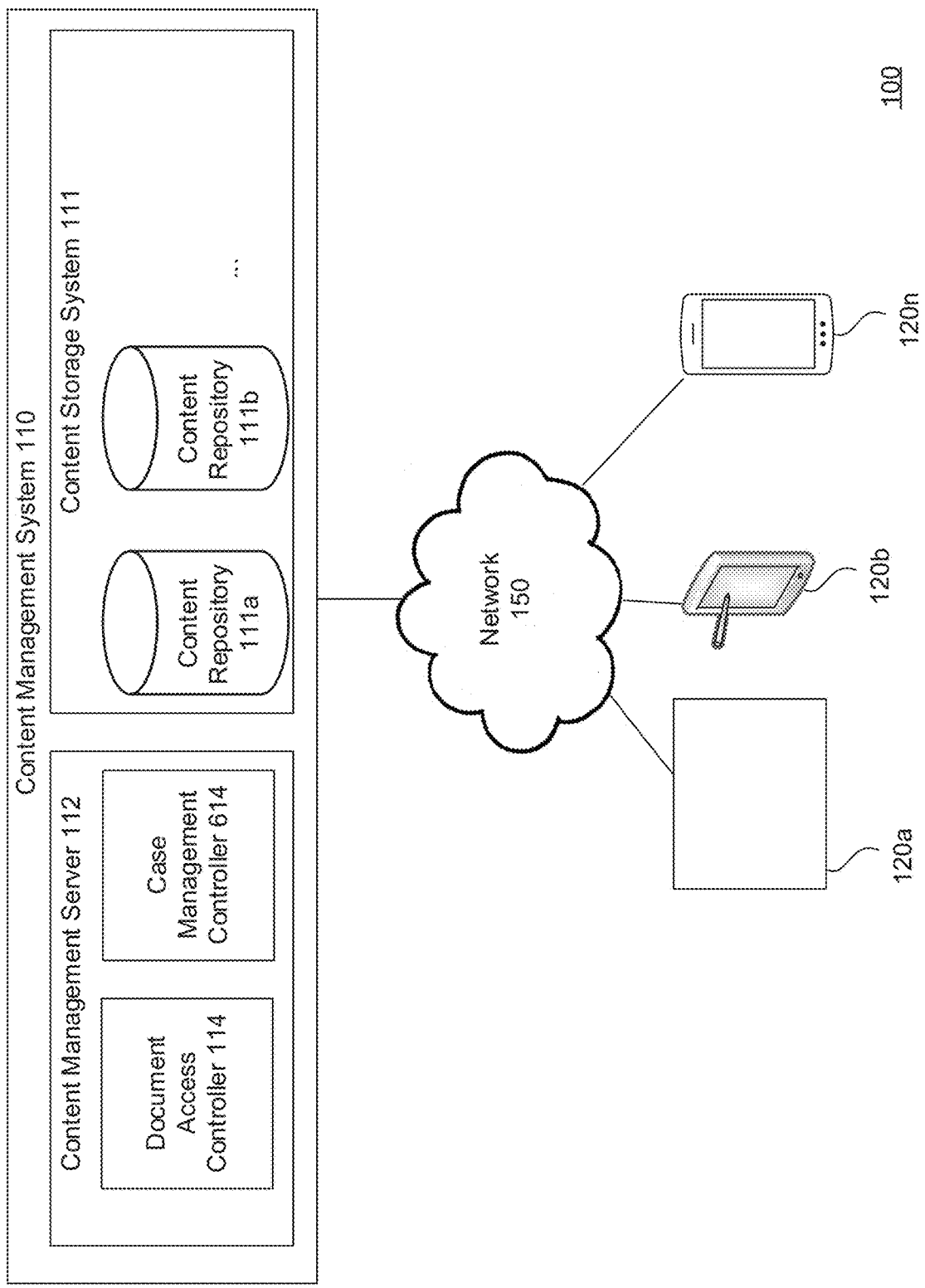
FIG. 6 illustrates an example high level block diagram of an enterprise content management architecture wherein the present invention may be implemented.

FIG. 6 illustrates an example high level block diagram of an enterprise content management architecture 600 wherein the present invention may be implemented. The enterprise may be a business, or an organization. Similar to the architecture 100 in FIG. 1, the architecture 600 may include a content management system 110, and a plurality of user computing devices 120a, 120b, . . . 120n, coupled to each other via a network 150. The content management system 110 may include a content storage system 111 and a content management server 112. The content storage system 111 may have one or more content repositories, e.g., 111a and 111b. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs).

The content storage system 111 may store content that user computing devices 120a-120n may access. Each content repository (e.g., 111a or 111b) may store a specific category of content, and allow users to interact with its content in a specific business context.

The content management server 112 is typically a remote computer system accessible over a remote or local network, such as the network 150. In one implementation, the content management server 112 may have a case management controller 614 which may control the routing of cases for initial case, follow-ups, and parallel follow-ups and version control of the case, as will be described in detail below.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 7:
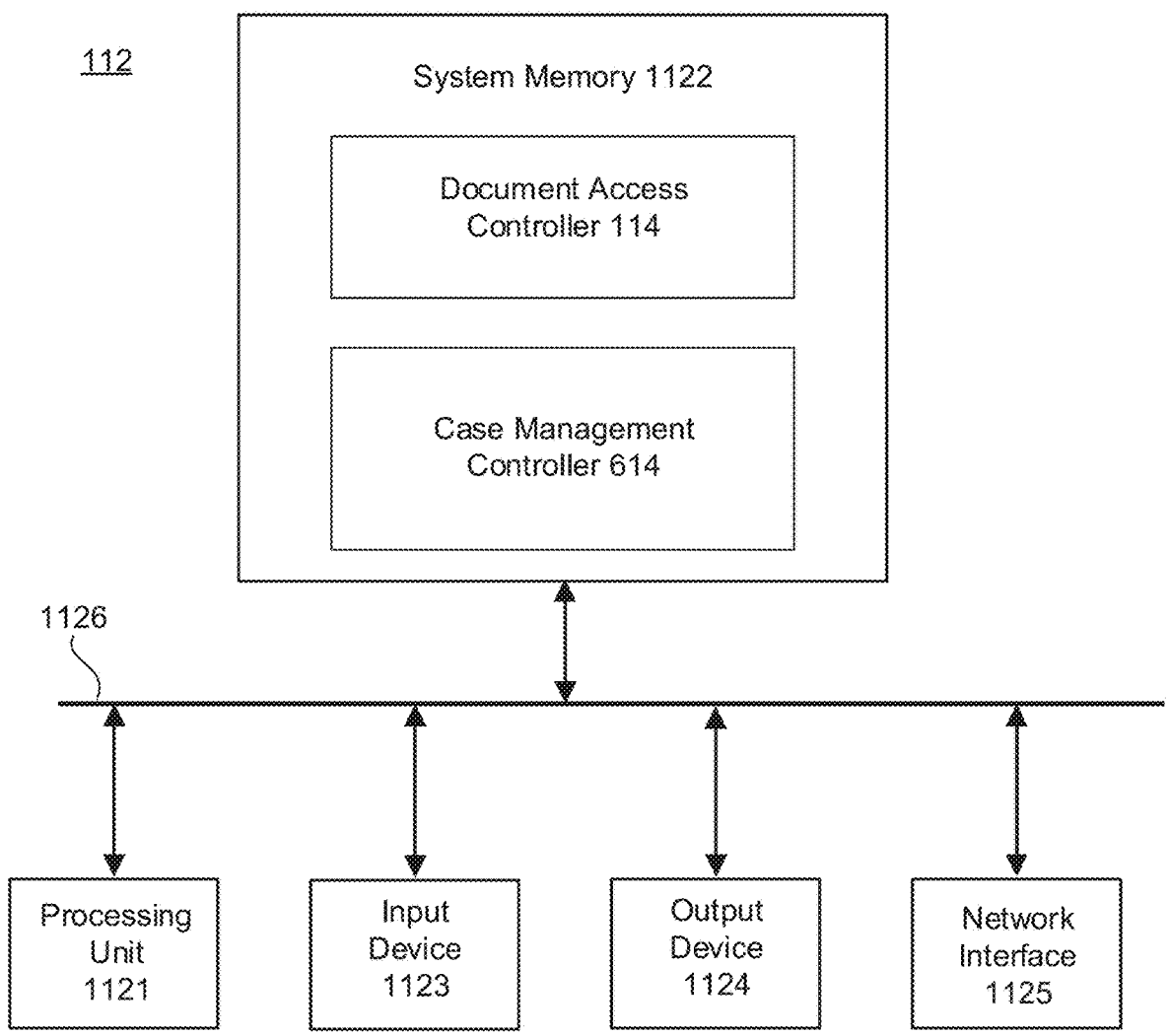
FIG. 7 illustrates an example high level block diagram of the content management server according to one embodiment of the present invention.

FIG. 7 illustrates an example high level block diagram of the content management server 112 according to one embodiment of the present invention. The content management server 112 may be implemented by the computing device 200, and may have a processing unit 1121, a system memory 1122, an input device 1123, an output device 1124, and a network interface 1125, coupled to each other via a system bus 1126. The case management controller 614 may be stored in the system memory 1122, together with the document access controller 114.

Figure 8:
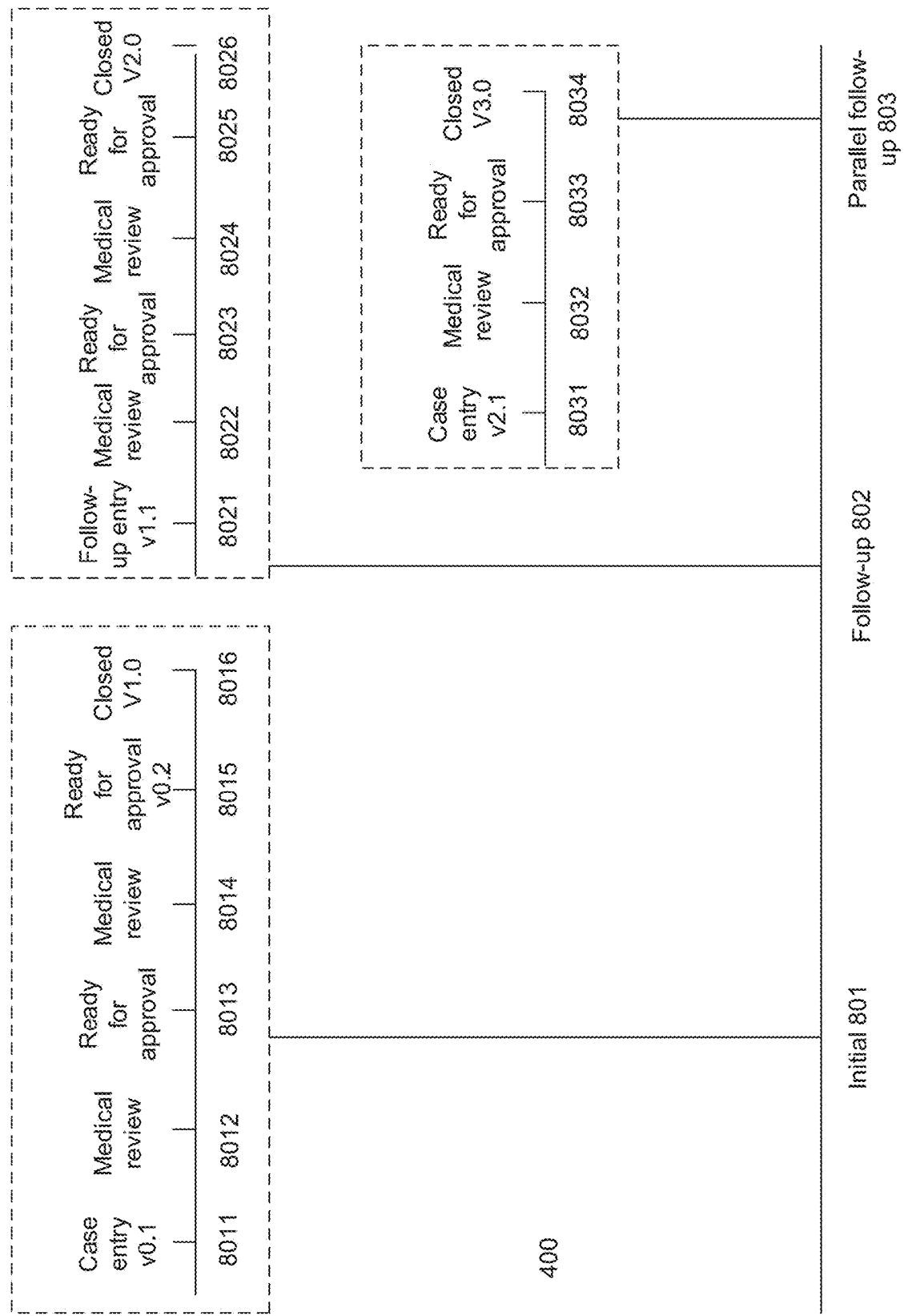
FIG. 8 illustrates an example version history of an adverse event case according to one embodiment of the present invention.

The present invention keeps a complete case version history. FIG. 8 illustrates an example version history of an adverse event case according to one embodiment of the present invention. As shown, the case version history 800 may include three major stages: an initial case stage 801, a follow-up stage 802, and a parallel follow-up stage 803. A major version of the case is developed during each stage and saved at the end of each stage, e.g., v1.0 for the initial case stage 801, v2.0 for the follow-up stage 802, and v3.0 for the parallel follow-up stage 803. A number of minor versions may be stored between to major cases, e.g., v0.1 and v0.2 during the initial case stage 801, v1.1 during the follow-up stage 802, and v2.1 during the parallel follow-up stage 803. Each stage may have a lifecycle, which may include a number of milestones or case statuses. For example, the initial case stage 801 may have a number of statuses including case entry 8011, medical review 8012, ready for approval 8013, second medical review 8014, second ready for approval 8015, and closed 8016. The follow-up stage 802 may have a number of statuses including case entry 8021, medical review 8022, ready for review 8023, and closed 8024. The parallel follow-up stage may have a number of case statues including case entry 8031, medical review 8032, ready for review 8033, and closed 8034.

Figure 9A:
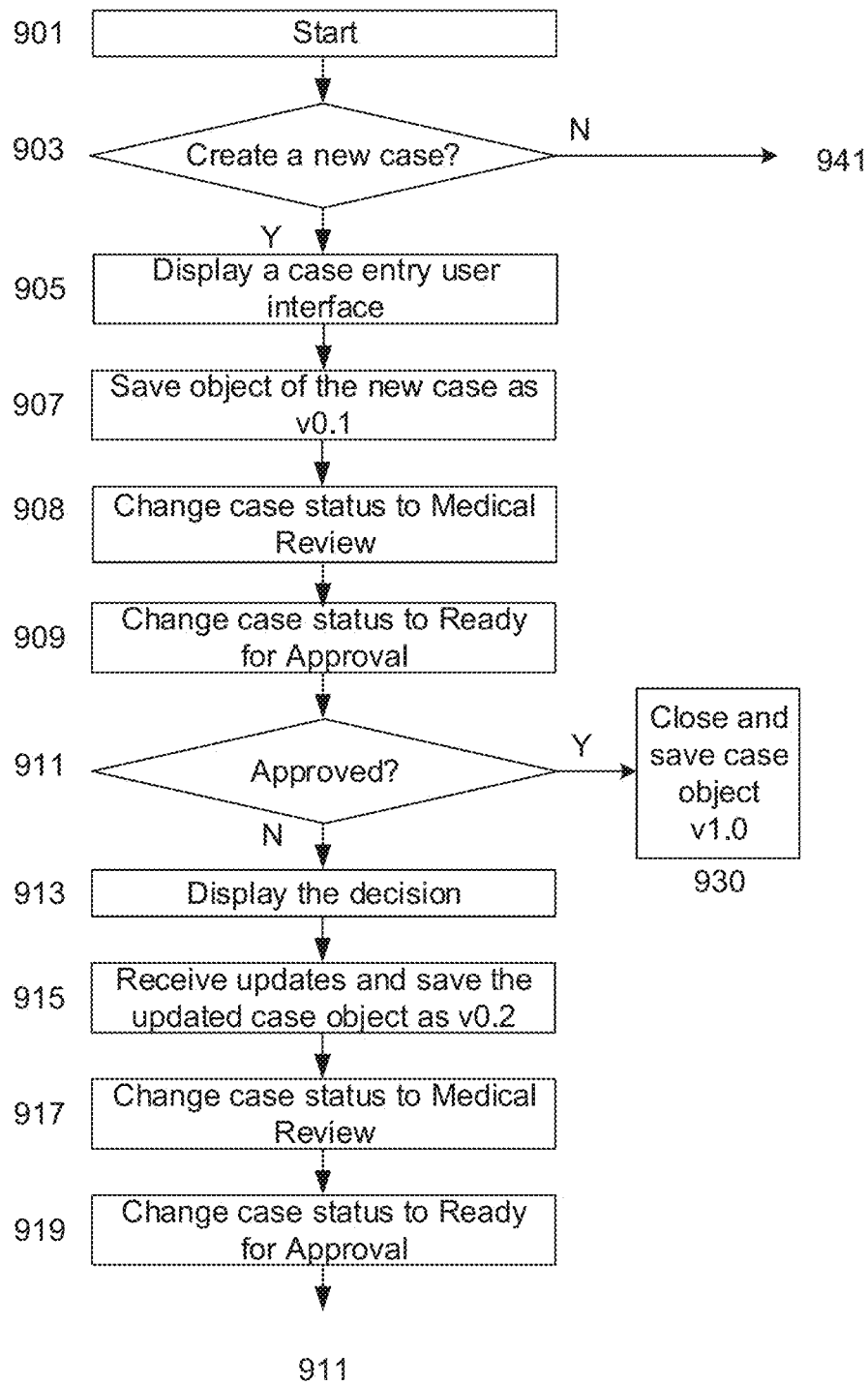
FIGS. 9A, 9B, and 9C illustrate an example workflow of a method for managing an adverse event case in a content management system according to one embodiment of the present invention.
Figure 9B:
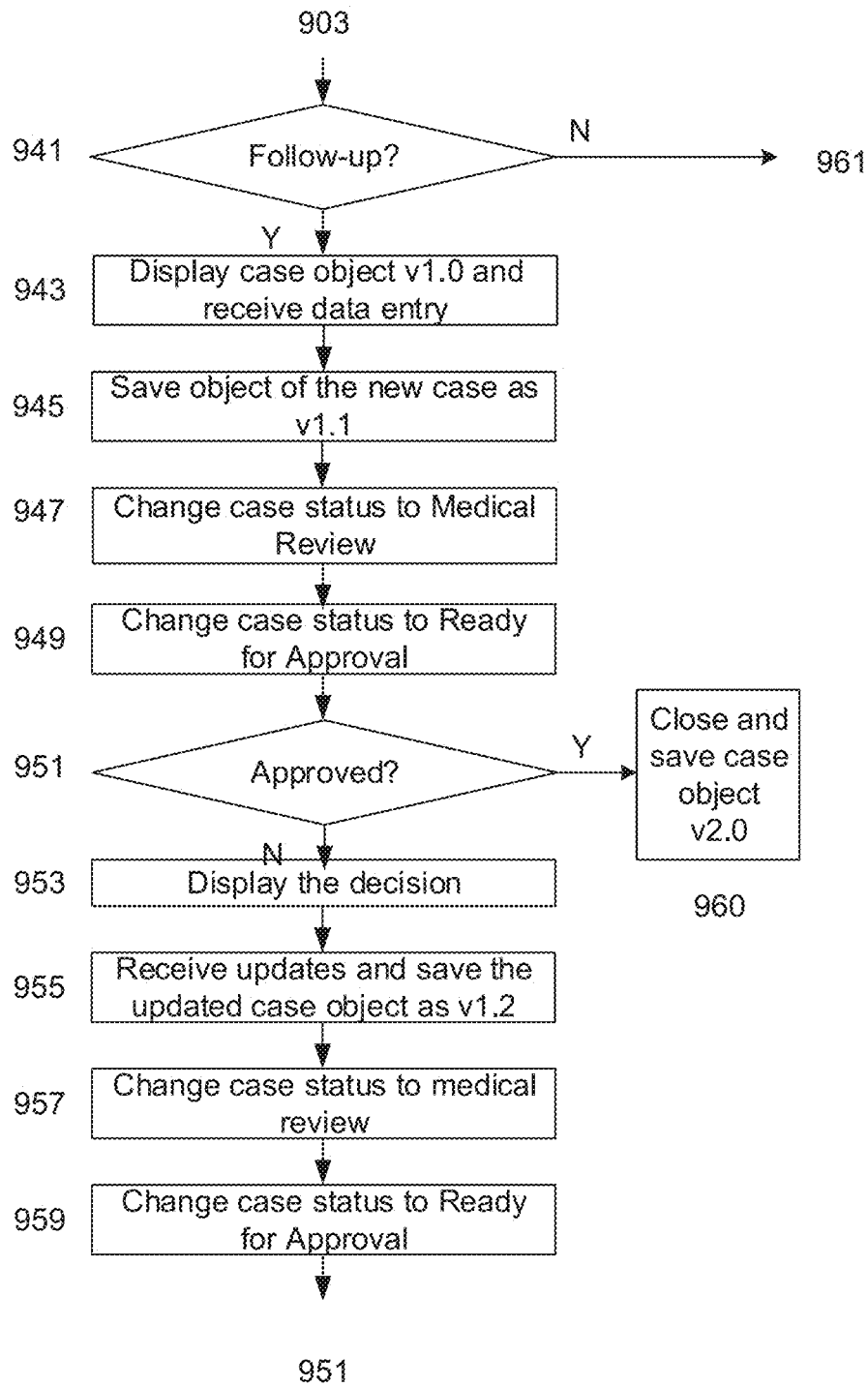
Figure 9C:
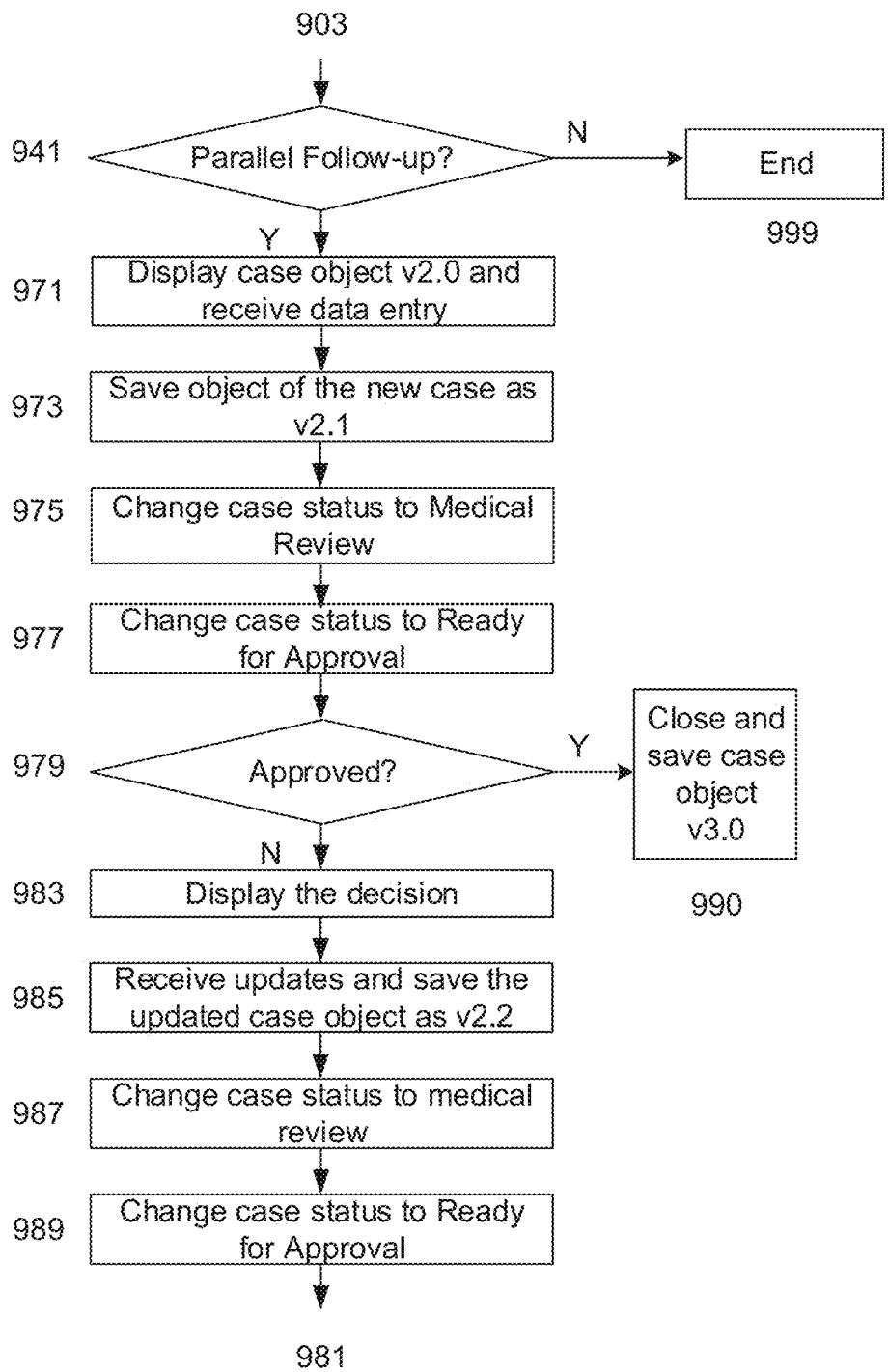

FIGS. 9A, 9B and 9C illustrate an example workflow of a method for managing a case in a content management system according to one embodiment of the present invention. The process may start at 901.

At 903, a first user interface may be displayed to allow a user to select an existing case, or create a new case. In one embodiment, the case is for managing an adverse medial event.

Figure 10:
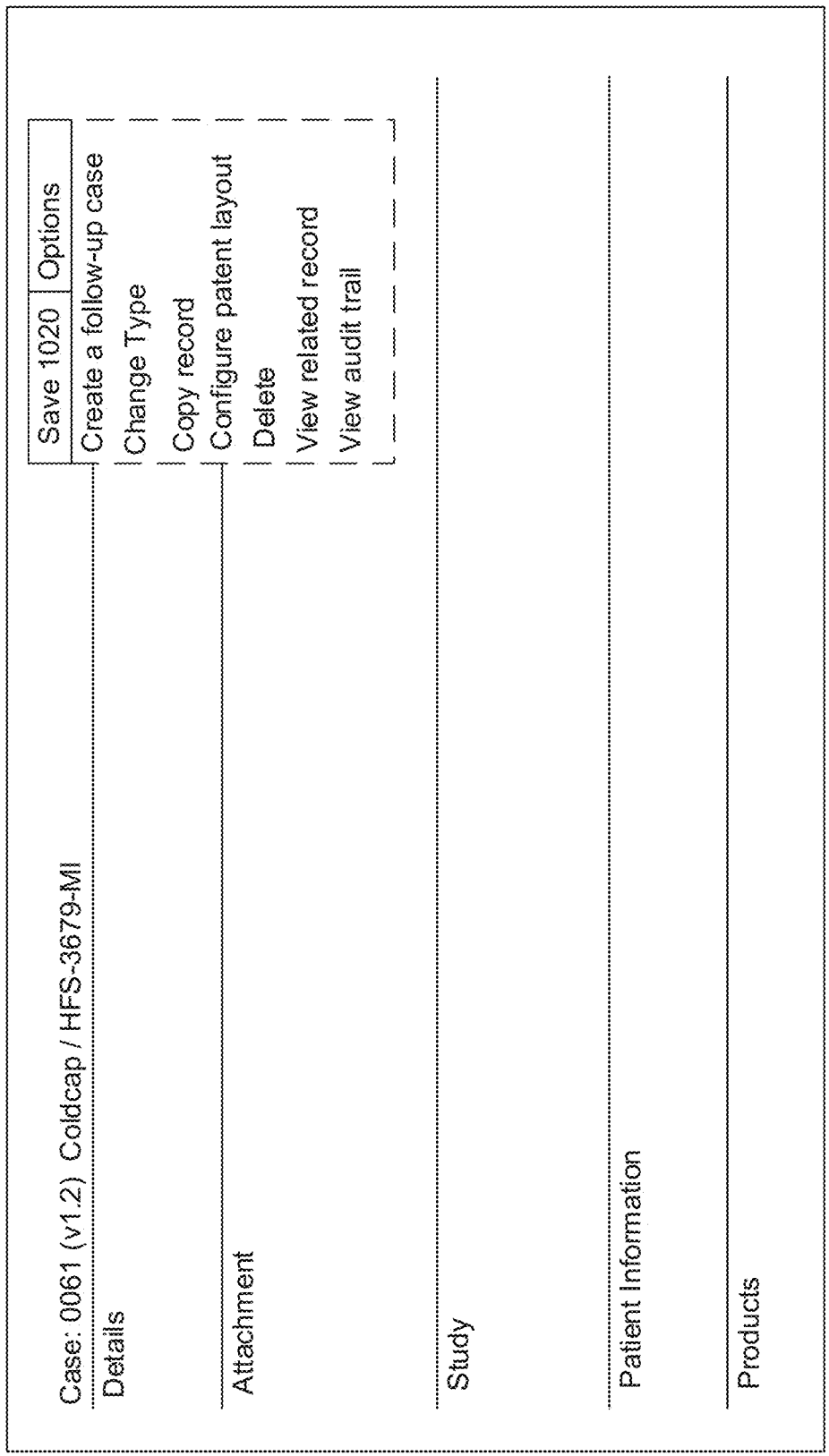
FIG. 10 illustrates an example user interface for managing an adverse event case in a content management system according to one embodiment of the present invention.

If the user selects to create a new case, an initial case may be created, and a case entry user interface may be displayed at 905 for the user to enter data of the initial case. The status of the case is case entry 8011. One example of the case entry user interface 1000 is shown in FIG. 10. As shown, the case entry user interface 1000 may have a number of fields to collect basic information of a new case, e.g., patient information, study information, and details of the case. The study information may include, e.g., a study name, study number and study type. Details of the case may include, e.g., version history, report type, receipt date, seriousness, event, case classification, and reporter's comments.

The case entry user interface 1000 may also include a button 1020 for storing the data and requesting medical review. The user may click on that button after finishing data entry for the initial case. At 907, an object may be created for the initial case in the content management system 600 and saved as v0.1 of the case when the button 1020 is clicked on.

At 908, the case status may change to medial review 8012. The medical review may be performed by appropriate medical reviewers, and a decision may be received. At 909, the case status may change to Ready for Approval 8013.

An input may be received at 911, indicating if the initial case is approved.

If yes, the initial case may be closed at 930, and the case object may be saved as a major version, e.g., v1.0.

If the case is not approved, the decision may be displayed at 913.

The user may open v0.1 of the saved object of the initial case, and corrected or supplement information may be received and saved at 915. Instead of overwriting v0.1 of the case object, the present invention allows the user to save the updated data as a new version of the case object, e.g., v0.2, while keeping the original case object v0.1 intact, so that the case version history 800 may include all versions of the case object.

At 917, the case status may change to medial review 8014 when the button 1020 is clicked on. A second medical review may be performed by appropriate medical reviewers, and a second decision may be received. At 919, the case status may change to Ready for Approval 8015. 911-919 may be repeated to create and review more minor versions (e.g., v0.3, and v0.4) until the case is approved.

If the user selects an existing case at 903, the process may proceed to 941, a user interface may be displayed so that the user can select to enter a follow-up of the case when the latest major version of the case (e.g., v1.0 or v2.0) is closed, or a parallel follow-up of the case when the latest major version of the case (e.g. v1.0 or v2.0) is still pending.

If follow-up is selected, a user interface may display the latest version of the case object (e.g., v1.0) to receive updates for the first follow-up at 943, and the case status may change to follow-up entry 8021. The user interface for receiving updates may be similar to the user interface 1000, and have a number of fields with data received before for defining the latest major version of the case object (e.g., v1.0).

The user may request for medical review after finishing entering updates for the first follow-up. At 945, an object may be created for the updated case, which may include the latest version of the case object updated with the first follow-up, in the content management system 600 and saved as v1.1 of the case. Instead of overwriting v1.0 of the case object, the present invention allows the user to save the updated data as a new version of the case object, e.g., v1.1, while keeping the original case object v1.0 intact, so that the case version history 800 may include all versions of the case object.

At 847, the case status may change to medial review 8022. A third medical review may be performed by medical reviewers, and a decision may be received. At 949, the case status may change to Ready for Approval 8023.

An input may be received at 951, indicating if the case is approved.

If yes, the case may be closed at 960, and the latest version of the case object v1.1, which includes the latest major version of the case object v1.0 updated with the first follow-up, may be saved as a new major version, e.g., v2.0.

If the case is not approved, the decision may be displayed at 953.

The user may open v1.1 of the saved object of the case, and corrected or supplement information may be received and saved at 955.

At 957, the case status may change to medial review 8024. The medical review may be performed by medical reviewers, and a decision may be received. At 959, the case status may change to Ready for Approval 8025. 951-959 may be repeated to create and review more minor versions (e.g., v1.3, and v1.4) for medical review until the first follow-up case is approved.

More follow-ups may be made to v1.0 of the case object.

If the user selects a parallel follow-up at 941, the process may proceed to 971. A user interface may display the latest major version of the case object, e.g., v2.0, to receive updates, and the case status may change to parallel follow-up entry 8031. The user interface for receiving updates for the parallel follow-up may be similar to the user interface 1000, and have a number of fields with data received before for defining the latest major version of the case object, e.g., v2.0.

The user may request for medical review after finishing entering updates for the parallel follow-up. At 973, an object may be created for the parallel follow-up, which may include the latest major version of the case object (e.g., v2.0) updated with the updates for the parallel follow-up, in the content management system 600 and saved as v2.1 of the case. Instead of overwriting v2.0 of the case object, the present invention allows the user to save the updated data as a new version of the case object, e.g., v2.1, while keeping the latest major version of the case object (e.g., v2.0) intact, so that the case version history 800 may include all versions of the case object.

At 975, the case status may change to medial review 8032. The medical review may be performed by medical reviewer, and a decision may be received. At 977, the case status may change to Ready for Approval 8033.

An input may be received at 979, indicating if the case is approved.

If yes, the case may be closed at 990, and the latest version of case object (e.g., v2.1) may be saved as a new major version, e.g., v3.0.

If the case is not approved, the decision may be displayed at 983.

The user may open v2.1 of the saved case object, and corrected and/or supplement information may be received and saved at 985.

At 987, the case status may change to medial review 8034. The medical review may be performed by medical reviewers, and a decision may be received. At 989, the case status may change to Ready for Approval 8035. 979-989 may be repeated until the parallel follow-up case is approved.

Although the parallel follow-up is described as a follow-up to v2.0 of the case object, it should be understood that it may be a follow-up to v1.0 of the case object if v1.0 has not been submitted yet. In addition, the system 600 may start to process the parallel follow-up anytime at the user's request, and at any point between 901 and 919, or 941 and 959.

The method of the present invention comprises: displaying a first user interface for receiving a selection of an existing case or a new case; receiving a selection of a new case on the first user interface; displaying a data entry user interface for receiving data of an initial version of an object of the new case; receiving a request for a first review; generating a first minor version of the object of the new case and saving the first minor version of the object of the new case in the content management system; receiving an input which indicates that the first minor version of the object of the new case is not approved; displaying a copy of the first minor version of the object of the new case, receiving a first update to it, and saving the first minor version of the object of the new case with the first update as a second minor version of the object of the new case while keeping the first minor version of the object of the new case in the content management system; receiving a request for a second review; receiving an input which indicates that the second minor version of the object of the new case is approved; and saving the second minor version of the object of the new case as a first major version of the object of the new case.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A method for managing a case in a content management system, comprising:
    receiving configuration metadata of a first data record and a second data record in the content management system;
    receiving a first query for data objects in the content management system;
    obtaining the first data record in response to the first query;
    displaying a first user interface for receiving a selection of an existing case or a new case;
    receiving a selection of a new case on the first user interface;
    displaying a data entry user interface for receiving data of an initial version of an object of the new case;
    receiving a request for a first review;
    generating a first minor version of the object of the new case and saving the first minor version of the object of the new case in the content management system;
    receiving an input which indicates that the first minor version of the object of the new case is not approved;
    displaying a copy of the first minor version of the object of the new case, receiving a first update to it, and saving the first minor version of the object of the new case with the first update as a second minor version of the object of the new case while keeping the first minor version of the object of the new case in the content management system;
    receiving a request for a second review;
    receiving an input which indicates that the second minor version of the object of the new case is approved; and
    saving the second minor version of the object of the new case as a first major version of the object of the new case to the content management system.

2. The method of claim 1, wherein the new case is for managing an adverse medical event.

3. The method of claim 1, further comprising: changing a status of the new case to closed after saving the second minor version of the object of the new case as the first major version of the object of the new case.

4. The method of claim 3, further comprising: receiving a selection of an existing case on the first user interface.

5. The method of claim 4, further comprising: receiving a selection for creating a first follow-up of the new case after the first major version of the object of the new case is saved.

6. The method of claim 5, further comprising: displaying a copy of the first major version of the object of the new case, receiving a second update to it, and saving the first major version of the object of the new case with the second update as a first minor version of an object of the first follow-up case while keeping the first major version of the object of the new case in the content management system.

7. The method of claim 6, further comprising: receiving a request for a third review.

8. The method of claim 7, further comprising: receiving an input which indicates that the first minor version of the object of the first follow-up case is approved.

9. The method of claim 8, further comprising: saving the first minor version of the object of the first follow-up case as a second major version of the object of the new case.

10. The method of claim 9, further comprising: changing a status of the first follow-up case to closed after saving the first minor version of the object of the first follow-up case as the second major version of the object of new case.

11. The method of claim 10, further comprising: receiving a selection for creating a second follow-up of the new case before the first major version of the object of the new case is saved.

12. The method of claim 11, further comprising: displaying a copy of the first major version of the object of the new case, receiving a third update to it, and saving the first major version of the object of the new case with the third update as a first minor version of an object of a second follow-up case while keeping the first major version of the object of the new case in the content management system.

13. The method of claim 12, further comprising: receiving a request for a fourth review.

14. The method of claim 13, further comprising: receiving an input which indicates that the first minor version of the object of the second follow-up case is approved.

15. The method of claim 14, further comprising: saving the first minor version of the object of the second follow-up case as a third major version of the object of the new case.

16. The method of claim 15, further comprising: changing a status of the second follow-up case to closed after saving the first minor version of the object of the second follow-up case as a first major version of the object of the second follow-up case.

17. A content management system, comprising:
    a plurality of repositories for storing data; and
    a case management controller for:
        displaying a first user interface for receiving a selection of an existing case or a new case;
        receiving a selection of a new case on the first user interface;
        displaying a data entry user interface for receiving data of an initial version of an object of the new case;
        receiving a request for a first review;
        generating a first minor version of the object of the new case and saving the first minor version of the object of the new case in the content management system;
        receiving an input which indicates that the first minor version of the object of the new case is not approved;
        displaying a copy of the first minor version of the object of the new case, receiving a first update to it, and saving the first minor version of the object of the new case with the first update as a second minor version of the object of the new case while keeping the first minor version of the object of the new case in the content management system;
        receiving a request for a second review;

receiving an input which indicates that the second minor version of the object of the new case is approved; and saving the second minor version of the object of the new case as a first major version of the object of the new case.

18. The system of claim 17, wherein the case management controller further receives a selection for creating a first follow-up of the new case after the first major version of the object of the new case is saved.

19. The system of claim 18, wherein the case management controller further receives a selection for creating a second follow-up of the new case before the first major version of the object of the new case is saved.

20. The system of claim 19, wherein the case management controller further displays a copy of the first major version of the object of the new case, receives a third update to it, and saves the first major version of the object of the new case with the third update as a first minor version of an object of a second follow-up case while keeping the first major version of the object of the new case in the content management system.

\* \* \* \* \*